United States Patent [19]

Johansson

[11] 3,807,538

[45] Apr. 30, 1974

[54] SAFETY DEVICE IN MOTOR SAW CENTRIFUGAL CLUTCH MECHANISMS

[76] Inventor: Rolf Anders Gunnar Johansson, Vare S-310 83, Unnaryd, Sweden

[22] Filed: Nov. 7, 1972

[21] Appl. No.: 304,302

[52] U.S. Cl.............. 192/104 C, 192/22, 192/28, 192/48.5, 192/103 A
[51] Int. Cl... F16d 43/24, F16d 47/02, F16d 43/08
[58] Field of Search............ 192/17 C, 22, 28, 48.5, 192/114 R, 145, 103 C, 104 R, 104 C, 103 B; 64/29

[56] References Cited
UNITED STATES PATENTS

| | | | |
|---|---|---|---|
| 3,662,622 | 5/1972 | Neumann.......................... | 192/22 X |
| 3,522,795 | 8/1970 | Seifert.......................... | 192/104 C X |
| 2,908,169 | 10/1959 | Schindel et al................. | 192/104 X |
| 2,858,388 | 10/1958 | Eastman.......................... | 192/28 X |
| 2,546,324 | 3/1951 | Tuft et al.......................... | 192/28 X |

Primary Examiner—Samuel Scott
Assistant Examiner—Lance W. Chandler
Attorney, Agent, or Firm—Pierce, Scheffler & Parker

[57] ABSTRACT

This invention relates to a safety device for chain motor saw centrifugal clutch mechanisms in which the hub yoke of the clutch is rotatably mounted on a shaft driven by the saw motor over coupling means capable of being disengaged by safety actuating means and comprising a disc fixed to the shaft and drive connection having a movable drive element between the disc and the hub yoke. Latching means are provided to maintain the effective drive position of the drive element and means are also provided to release said latching means from the effective drive position. The drive element is arranged for pivotal movement against a spring force under the action of centrifugal force from a position of engagement with the hub yoke to a position free therefrom. A single spring element has the dual function of forming a latching element and providing the spring force acting on the drive element.

10 Claims, 5 Drawing Figures

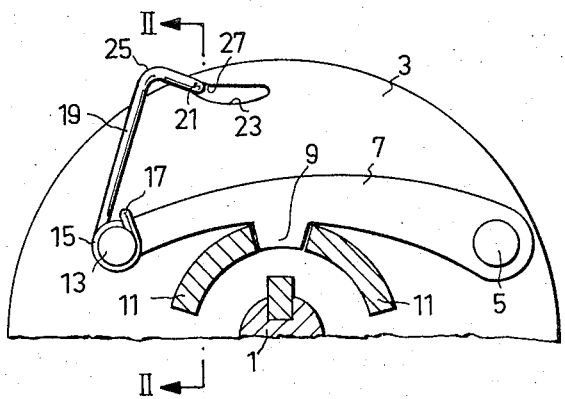
FIG.2
FIG.1
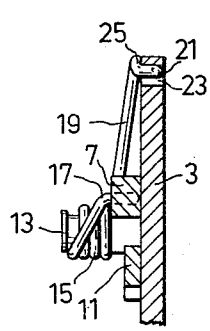
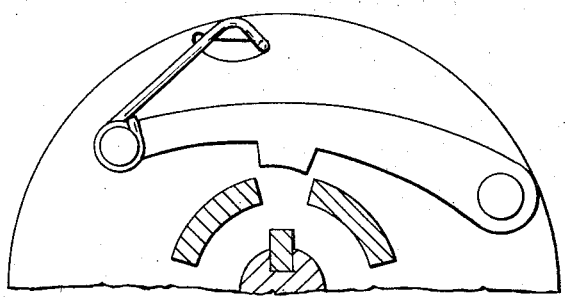
FIG.3
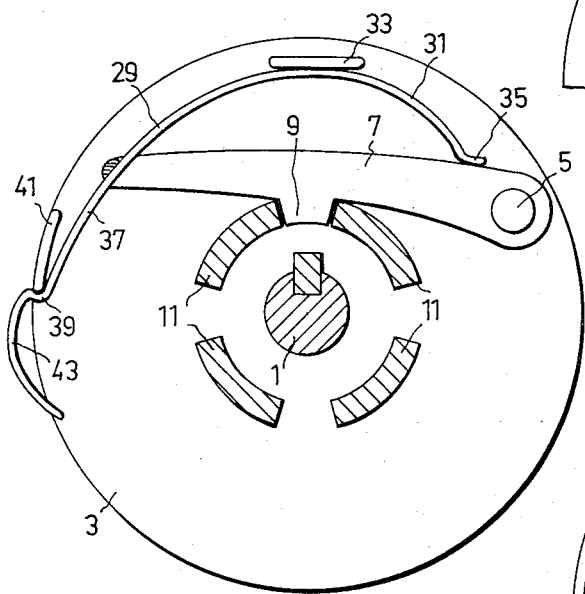
FIG.4
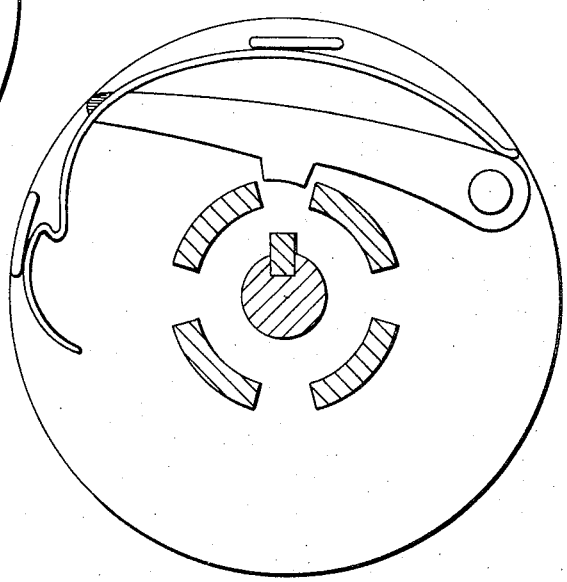
FIG.5

SAFETY DEVICE IN MOTOR SAW CENTRIFUGAL CLUTCH MECHANISMS

The present invention relates to a safety device for motor saw centrifugal clutch mechanisms of the type in which the hub yoke of the centrifugal clutch is mounted for rotation on a drive shaft driven by the motor over a coupling means capable of being disengaged by means of a safety actuating means, and in which the coupling means comprises a drive disc fixedly attached to the drive shaft and a drive connection having a movable drive element disposed between the drive disc and the hub yoke, and in which the drive element is actuated by a force which attempts to move the drive element out of its engaging position and against the action of which force the drive element can be latched in a position of engagement by means of a latching member capable of being released by the safety actuating means. Such a motor saw centrifugal clutch mechanism is found described in co-pending U.S. patent application Ser. No. 228,061, now U.S. Pat. No. 3,785,465.

The safety device of the present invention is an improvement of the safety device known from the aforesaid U.S. patent application Ser. No. 228,061, and the object of the invention is to reduce the load, i.e., the stresses and strains to which the coupling means and the safety actuating means of the known centrifugal clutch mechanism are subjected when disengaging the coupling means. This is achieved by constructing the drive element of the improved centrifugal clutch safety device in the form of an arm capable of being pivoted against the action of a spring by centrifugal force around a post mounted on the drive disc, said drive arm being arranged for movement between a radially inner position in which it engages the hub yoke of the clutch and a radially outer position to which it is moved by centrifugal force and in which it is disengaged from said hub yoke, said latching member having the form of a long, slender latching element connected to the free end of the drive arm and extending to a latching means located adjacent the peripheral edge of the drive disc and arranged to engage said latching element to prevent movement thereof when the safety actuating means is inoperative and which latching element presents in the vicinity of the latching means a latching element portion which projects beyond the peripheral edge of the disc, said portion being arranged to co-act with the safety actuating means in a manner such that when said safety actuating means is manipulated, the latching element is moved from said latching means so that the drive arm is free to pivot outwardly. Since the latching element is in the form of a long, slender member made from e.g. wire or strip material, the mass to be moved when disengaging the latching element is very small, and hence also the stress and strain to which the latching element and safety actuating means are subjected.

According to one preferred embodiment of the invention the portion of the latching element protruding beyond the periphery of the drive disc is constructed so that it can be actuated by the safety actuating means irrespective of the direction in which the drive disc rotates. This prevents damage to the latching element should the motor suddenly change its direction of rotation, as is liable to occur when working with two-stroke motors for example.

According to another embodiment of the invention the spring acting on the drive arm against the centrifugal force and the latching element form one and the same spring element, thereby simplifying the construction of the device and reducing the number of components.

The invention will now be described with reference to two embodiments thereof illustrated in the accompanying drawing. In the drawing, FIG. 1 is an axial view of a first embodiment of a safety coupling means constructed in accordance with the invention and shows the coupling means engaged. FIG. 2 is a sectional view taken through the line II—II in FIG. 1. FIG. 3 illustrates the safety coupling shown in FIGS. 1 and 2 with the coupling means disengaged, and FIGS. 4 and 5 illustrate a second embodiment of a safety coupling means constructed in accordance with the invention and showing respectively the coupling means in its engaged and disengaged position.

The safety coupling means illustrated in FIGS. 1–3 comprises a drive disc 3 fixedly mounted on a motor shaft 1. Close to the periphery of the drive disc 3 is mounted an axially extending post 5 around which a drive arm 7 is arranged to pivot. The drive arm 7 is provided with a projection 9 extending towards the shaft 1, the projection 9 in the position illustrated in FIG. 1 being located in the space between two circle-arcuate gripping elements 11 arranged concentrically around the shaft 1. Four such gripping elements are arranged on the hub yoke of the centrifugal clutch. The hub yoke (not shown in detail) is rotatably mounted on the shaft 1 in a manner described in the aforementioned U.S. application Ser. No. 228,061.

Arranged on the free end of the drive arm 7 is an axially extending stud 14 around which is coiled a wire spring 15. The end 17 of the spring 15 is bent rearwardly to extend parallel with the stud 13 and to rest on the top face of the drive arm 7. The spring 15 has a spring leg 19 extending from the drive arm 7 towards the periphery of disc 3. The spring 15 is wound in a direction such that an axially bent end portion 21 of the spring leg 19 engages under tension the left end of a groove 23 disposed in the drive disc 3 and extending generally parallel to the drive arm 7. The spring leg 19 presents at a point adjacent the end portion 21 an arcuate portion 25 which projects beyond the periphery of the drive disc 3. The side of the groove 23 remote from the shaft 1 is provided with a shoulder 27 which extends towards the free end of the drive arm 7 and which is located at such a distance from the left end of the groove, as seen in the Figure, that the end 21 of the spring can occupy the illustrated rest position between the shoulder 27 and the left end of the groove.

When the motor shaft and the drive disc 3 are stationary, the drive arm 7 is held in engagement with the hub yoke 11 of the centrifugal clutch by the force exerted by spring 15. When the drive disc 3 rotates, on the other hand, the drive arm is acted upon by centrifugal force and attempts to swing around the posts out towards the edge of the disc 3. Before the arm 7 can move, however, the centrifugal force must first overcome the force exerted by the spring 15, and hence the drive arm is unable to pivot around the post 5 until the drive disc 3 exceeds a certain determined rotational speed. When occupying the position illustrated in FIG. 1, however, the drive arm 7 is unable to move outwardly, because the end 21 of the spring 15 is in abutment with the shoulder 27 and the force exerted by the drive arm 7 as the result of the centrifugal force acting thereon is thus unable to move the spring end 21 past the shoulder 27 to the right along groove 23. The spring 15 thus latches the drive arm 7 in its position of engagement. When disengaging the safety coupling means, a release means is brought into engagement with the arcuate spring portion 25 adjacent the edge of the disc 3 so as to move the spring portion 25 inwardly, thereby disengaging the spring end 21 from the shoulder 27 so that the spring end 21 can be moved along the groove 23 under the action of the centrifugal force acting on the drive arm, this force being greater than the force exerted by the spring. The drive arm 7 will then pivot to the position illustrated in FIG. 3 against the action of spring 15, in which position the drive disc is disconnected from the hub yoke 11 of the clutch.

When the rotational speed of the drive disc 3 falls beneath a certain pre-determined magnitude, the spring 15, in the position shown in FIG. 3, will ocercome the centrifugal force acting on the drive arm 7 and move the drive arm down into engagement with the gripping elements 11, the end 21 of the spring 15 returning to its rest position at the left end of the groove 23 as seen in FIG. 1.

The second embodiment of the safety device illustrated in FIGS. 4 and 5 differs from that illustrated in FIGS. 1–3 inasmuch as the spring connected to the drive arm 7 has a different form. With the second embodiment a leaf spring 29 is attached to the free end of the drive arm 7 in a manner to provide a spring leg 31 extending to the right over the drive arm 7 as seen in the drawing and a spring leg 37 extending to the left of the drive arm. The right leg 31 of the spring 29 is extended in an arcuate path over the drive arm 7 in a manner such that an intermediate portion of the leg 31 bears against a shoulder 33 arranged in the vicinity of the peripheral edge of the drive disc 3. Engagement of said intermediate portion of the leg 31 with the shoulder 33 causes the free end of the leg 31, which in the illustrated embodiment is bent at 35, to bear against the top face of the drive arm 7 in the vicinity of the post 5. The left leg 37 of the spring 29 extends out towards the peripheral edge of the drive disc 3 and is provided with an outwardly bent portion 39 which abuts a latching shoulder 41 arranged at the peripheral edge of the disc. The free end of the spring leg 37 projecting beyond the spring portion 39 has the form of an arcuate spring portion 43 which projects beyond the edge of the disc.

With the embodiment of FIGS. 4 and 5, the drive arm 7 is held in its position of engagement by the right leg 31 of the leaf spring 29 (FIG. 4), while the left leg 37 of the spring, in cooperation with the latching shoulder 41, forms the latch which prevents the drive arm 7 from moving outwards as a result of the centrifugal force acting thereon. When disengaging this safety coupling means, the safety release means is caused to actuate the arcuate outwardly projecting portion 43 of the leg 37 so that the spring portion 39 is moved out of engagement with the shoulder 41, whereby the drive arm is able to pivot against the spring force exerted by leg 31 to the position shown in FIG. 5 under the action of centrifugal force. Subsequent to the rotational speed of the drive disc falling below a predetermined level, the force exerted by spring leg 37 will be sufficient to overcome the centrifugal force so that the drive arm 7 can be moved by the leg 37 from the position shown in FIG. 5 to the position shown in FIG. 4, whereupon the spring portion 39 will engage the latching shoulder 41 to latch the drive arm 7 in its position of engagement.

Although the invention has been illustrated and described with reference to two embodiments, it is not especially restricted thereto but can be modified within the scope of the appended claims. For example, with the embodiments illustrated in FIGS. 1–5 the same spring has been arranged to serve two purposes, namely to act as a latch against movement of the drive arm when the arm is subjected to centrifugal force and to return the drive arm to its position of engagement when the safety coupling means has been disengaged. It lies within the purview of the invention, however, to construct the spring 15 in relation to the general geometrical arrangement of the device in a manner such that the spring is too weak to move the drive arm 7 to its position of engagement and can thus only serve as a latching means. In a similar manner, the spring 29 of the second embodiment can be replaced with a spring corresponding solely to the left spring leg 37. These two modifications, however, would require provision of an additional spring to return the drive arm to its position of engagement of the disengagement of the clutch, e.g. a tension spring tensioned between the free end of the drive arm 7 and a peg mounted in the vicinity of the peripheral edge of the drive disc 3 beneath the said end of the drive arm, as seen in the drawings. Alternatively, a compression spring can be mounted between the free end of the drive arm and the periphery of the drive disc above said free end. It is also possible to replace the springs 15 and 29 with a rigid latching element having, for example, the same form as the spring 15 and the spring leg 37, respectively. This latter latching element may be arranged to be actuated solely by centrifugal force or may be actuated by a tension spring which may then simultaneously form the drive arm return spring. The latching shoulder 27 may be excluded in this latter alternative, provided that the groove 23 is suitably placed.

What I claim is:

1. A safety device in motor saw centrifugal clutch mechanisms of the type in which the hub yoke of the centrifugal clutch is mounted for rotation on a drive shaft by the motor over a coupling means capable of being disengaged by means of a safety actuating means, and in which the coupling means comprises a drive disc fixedly attached to the drive shaft and a drive connection having a movable drive element disposed between the drive disc and the hub yoke, and in which the drive element is actuated by a force which attempts to move the drive element out of its engaging position and against the action of which force the drive element can be latched in a position of engagement by means of a latching member capable of being released by a safety actuating means, the improvement wherein the drive element has the form of a drive arm capable of being pivoted against the action of a spring by centrifugal force around a post mounted on the drive disc, said drive arm being arranged for movement between a radially inner position in which it engages the hyb yoke of the clutch and a radially outer position to which it is moved by centrifugal force and in which it is disengaged from said hub yoke, said latching member having the form of a long, slender latching element connected to the free end of the drive arm and extending to a latching means located adjacent the peripheral edge of the drive disc and arranged to engage said latching element to prevent movement thereof when the safety actuating means is inoperative, and which latching element presents in the vicinity of the latching means a latching element portion which projects beyond the peripheral edge of the disc, said portion being arranged to co-act with the safety actuating means in a manner such that when said safety actuating means is manipulated, the latching element is moved from said latching means so that the drive arm is free to pivot outwardly.

2. A safety device according to claim 1, characterized in that the latching element portion projecting beyond the peripheral edge of the drive disc is formed so as to be actuatable by the safety actuating means irrespective of the rotational direction of the drive disc.

3. A safety device according to claim 1, characterized in that one end of the latching element is wound around a stud on the free end of the drive arm, the centre portion of said latching element extending from the drive arm to the periphery of the drive disc and presenting a curved portion which merges into an end portion of the spring adapted to co-act with the latching means, said curved portion forming the latching element portion projecting beyond the peripheral edge of the drive disc.

4. A safety device according to claim 3, characterized in that the latching means has the form of a groove arranged in the drive disc, and in that the latching element engages said groove through a latching element end portion which is bent to substantially right angles to the plane of the drive disc.

5. A safety device according to claim 4, characterized in that the groove extends generally parallel to the drive arm when said arm occupies its position of engagement and is shaped such that with the safety actuating means unactuated, the end portion of the latching element remains at one end of the groove despite the action of centrifugal force on the drive arm.

6. A safety device according to claim 5, characterized in that the groove has an inwardly extending shoulder on the outer wall thereof.

7. A safety device according to claim 1, characterized in that the latching means comprises a shoulder and the latching element has a preferably bent portion which co-acts with said shoulder and which adjoins the latching element portion projecting beyond the peripheral edge of the drive disc, which latter portion is arcuate in shape.

8. A safety device according to claim 1, characterized in that the latching element has the form of a spring and that this spring and the spring actuating the drive arm against the action of centrifugal force acting thereon are one and the same spring element.

9. A safety device according to claim 7, characterized in that the force exerted by the spring is selected in relation to the geometrical relationship of the drive arm, the spring and the groove so that at rotational speeds below the disengaging speed of the safety coupling said spring is able to overcome the centrifugal force acting on the drive arm and to return said drive arm to engagement with the hub yoke, the said end of spring returning to its latching position in the groove.

10. A safety device according to claim 7, characterized in that the latching element comprises one leg of a double-leg spring, the other leg of which extends in an arcuate path from the free end of the drive arm to the pivot point end of said arm, and that an abutment is arranged to engage the radially outer surface of the arcuate portion of said other leg and to tension said arcuate portion so that the end of said other leg bears against the pivot point end of the drive arm.

* * * * *